United States Patent
Blakely, III

(10) Patent No.: US 7,452,127 B2
(45) Date of Patent: Nov. 18, 2008

(54) ANEMOMETER WITH NON-CONTACT TEMPERATURE MEASUREMENT

(75) Inventor: Gerald W. Blakely, III, Lincoln, MA (US)

(73) Assignee: Extech Instruments Corporation, Waltham, MA (US)

( * ) Notice: Subject to any disclaimer, the term of this patent is extended or adjusted under 35 U.S.C. 154(b) by 67 days.

(21) Appl. No.: 11/189,122

(22) Filed: Jul. 25, 2005

(65) Prior Publication Data

US 2007/0019705 A1    Jan. 25, 2007

(51) Int. Cl.
*G01K 1/08* (2006.01)
*G01K 13/00* (2006.01)
*G01J 5/00* (2006.01)
*G01P 5/00* (2006.01)

(52) U.S. Cl. .................. 374/142; 374/121; 374/208; 73/170.12

(58) Field of Classification Search ............. 73/170.13, 73/204.19, 170.12; 374/142, 121, 208
See application file for complete search history.

(56) References Cited

U.S. PATENT DOCUMENTS

| | | | | |
|---|---|---|---|---|
| 1,987,617 A | * | 1/1935 | Graham et al. | 73/170.12 |
| 4,537,068 A | * | 8/1985 | Wrobel et al. | 73/861.02 |
| 5,102,230 A | * | 4/1992 | Kobayashi et al. | 374/109 |
| 5,710,380 A | * | 1/1998 | Talley et al. | 73/861.85 |
| 5,783,745 A | * | 7/1998 | Bergman | 73/170.13 |
| 6,036,360 A | * | 3/2000 | Takata et al. | 374/124 |
| 6,257,074 B1 | * | 7/2001 | Kellerman | 73/861.94 |
| 6,684,174 B2 | * | 1/2004 | Clark et al. | 702/138 |
| 6,901,089 B1 | * | 5/2005 | Hollander | 372/24 |
| 2004/0066833 A1 | * | 4/2004 | Blakeley, III | 374/120 |
| 2005/0053117 A1 | * | 3/2005 | O'Neill et al. | 374/121 |
| 2005/0241389 A1 | * | 11/2005 | Kitahara et al. | 73/204.23 |
| 2006/0193369 A1 | * | 8/2006 | O'Neill et al. | 374/109 |

FOREIGN PATENT DOCUMENTS

| | | | |
|---|---|---|---|
| JP | 57103060 A | * | 6/1982 |
| JP | 02115787 A | * | 4/1990 |
| JP | 03186767 A | * | 8/1991 |
| JP | 06194198 A | * | 7/1994 |
| JP | 2002107175 A | * | 4/2002 |

* cited by examiner

*Primary Examiner*—Gail Verbitsky
*Assistant Examiner*—Mirellys Jagan
(74) *Attorney, Agent, or Firm*—MacPherson Kwok Chen & Heid LLP

(57) ABSTRACT

An anemometer with non-contact temperature measurement capability, including a air velocity meter, contained at least partially in a housing and having outputs relating to measured air velocity parameters including air velocity and ambient temperature, an output display contained in the housing, for displaying measurements to a user, a non-contact optically-based internal temperature sensing device, having an output related to optically sensed IR temperature and circuitry contained in the housing for processing both the air velocity or volume meter output and the temperature sensing device output, and transmitting the processed output to the output display.

15 Claims, 5 Drawing Sheets

ANEMOMETER WITH NON-CONTACT TEMPERATURE MEASUREMENT

RELATED U.S. PATENT AND APPLICATION DATA

This application claims the benefit of the following non-provisional applications: U.S. patent application No. 10/654,851, "Multimeter with Non-Contact Temperature Measurement," filed Sep. 4, 2003, of which this application is a Continuation-in-Part, and which is included herein by reference; U.S. patent application No. 10/911,177, "Instrument for Non-Contact Infrared Temperature Measurement Combined with Tachometer Functions," filed Aug. 4, 2004, of which this application is a Continuation-in-Part, and which is included herein by reference; U.S. patent application No. 10/910,894, "Instrument for Non-Contact Infrared Temperature Measurement Having Current Clamp Meter Functions," filed Aug. 4, 2004, of which this application is a Continuation-in-Part, and which is included herein by reference; and U.S. patent application No. 11/039,653, "Humidity Meter with Non-Contact Temperature Measurement," filed Jan. 19, 2005, of which this application is a Continuation-in-Part, and which is included herein by reference.

FIELD OF THE INVENTION

This invention relates to an anemometer that is typically used for measuring air velocity and related parameters, also having non-contact infrared (IR) temperature measurement capabilities.

BACKGROUND OF THE INVENTION

There are many situations in which technicians and others need to accomplish both non-contact temperature measurement along with measurement of air velocity and related parameters such as the measurement of air volume. A thermo-anemometer is typically used to measure parameters including (but not necessarily limited to) air velocity and ambient temperature. The ambient temperature-measuring sensor is usually located in the same enclosure as the air velocity measuring sensor. This prevents or reduces the ability to use the temperature measuring device to make a contact temperature measurement. In addition, very often there is a need for non-contact measurement of surface temperatures that cannot be easily accessed with a contact type measuring device. Present practices require the use of two different instruments, typically an air velocity meter and a thermometer or non-contact pyrometer, to perform both air velocity meter and surface temperature measurement tasks.

SUMMARY OF THE INVENTION

It is therefore a primary object of this invention to provide an instrument that can be used to measure both air velocity parameters and non-contact temperature. Many of the functions of these measurements, such as the display, power supply, housing, and analog to digital converter, can be common to the air velocity meter functionality and the non-contact temperature measurement functionality. With this invention, portability is improved by only having to carry one instrument for use in the field. To further simplify use for quick field measurements, in a preferred embodiment there is no need to relocate the air velocity enclosure for the temperature measurement function.

This invention features an air velocity meter with non-contact temperature measurement capability. The air velocity meter is contained in a housing, and has outputs relating to measured air velocity parameters, including but not limited to air velocity and ambient temperature. For use in a duct with a known cross-section, such velocity measurements can be translated into volume measurements, and one or both can be reported to the user. There is also an output display contained in the housing, for displaying results to a user. A non-contact, optically-based temperature sensing device is coupled to the housing, and has an output related to non-contact sensed temperature. Circuitry contained in the housing processes both the air velocity meter outputs and the non-contact, optically-based temperature sensing device output, and transmits the processed outputs to the output display.

The air velocity meter is preferably a digital air velocity meter with a vane. The non-contact, optically-based temperature sensing device may comprise an infrared sensor and includes a laser pointer. The infrared temperature-sensing device may further comprise a lens, proximate the infrared sensor, for focusing entering radiation and protecting the infrared sensor from damage. The infrared temperature sensing device may define a sense axis that is fixed relative to the housing, or can be adjustable relative to the housing. When adjustable, the temperature sensing device may be mounted in an assembly that is coupled to and movable, relative to the housing (for example rotatable). This allows the user to aim the non-contact temperature sensing device.

The air velocity meter with non-contact IR temperature measurement capability may further comprise an optical aiming device such as a laser pointer LED coupled to the housing, to assist the user in aiming the non-contact temperature sensing device at an object whose temperature is to be measured. The optical aiming device may define an aiming axis that is adjustable relative to the housing, which may be accomplished with the optical aiming device mounted in a mount that is coupled to and movable relative to the housing (e.g., rotatable), to allow the user to aim the optical aiming device. The optical aiming device preferably comprises a diode laser device.

The air velocity meter may further comprise a user-operable switch for switching at least some of the circuitry between the air velocity meter outputs and the infrared temperature sensing device output. The air velocity meter may also include a user-operable switch for selectively routing the infrared temperature sensing device output to the circuitry, or for selectively holding the sensed temperature. The air velocity meter may also include an ambient temperature measuring device located in near proximity to the air velocity sensing device. These two in sum allow measurement of parameters including, but not limited to, ambient temperature and air velocity. The air velocity and ambient temperature sensing devices may be mounted in a separate removable enclosure that may be used to measure parameters remote from the location of the meter housing, or alternately may be enclosed in the meter housing.

BRIEF DESCRIPTION OF THE DRAWINGS

Other objects, features and advantages will occur to those skilled in the art from the following description of the preferred embodiments, and the accompanying drawings, in which.

DESCRIPTION OF THE PREFERRED EMBODIMENTS OF THE INVENTION

In the invention, the common functions required for processing of signals from an infrared (IR) temperature sensor, and those of a digital air velocity meter, are accomplished by common circuitry, and a common display and other parts as described above. The housing can be designed to include the IR sensing element, and an optional laser aiming device.

Figure 1:
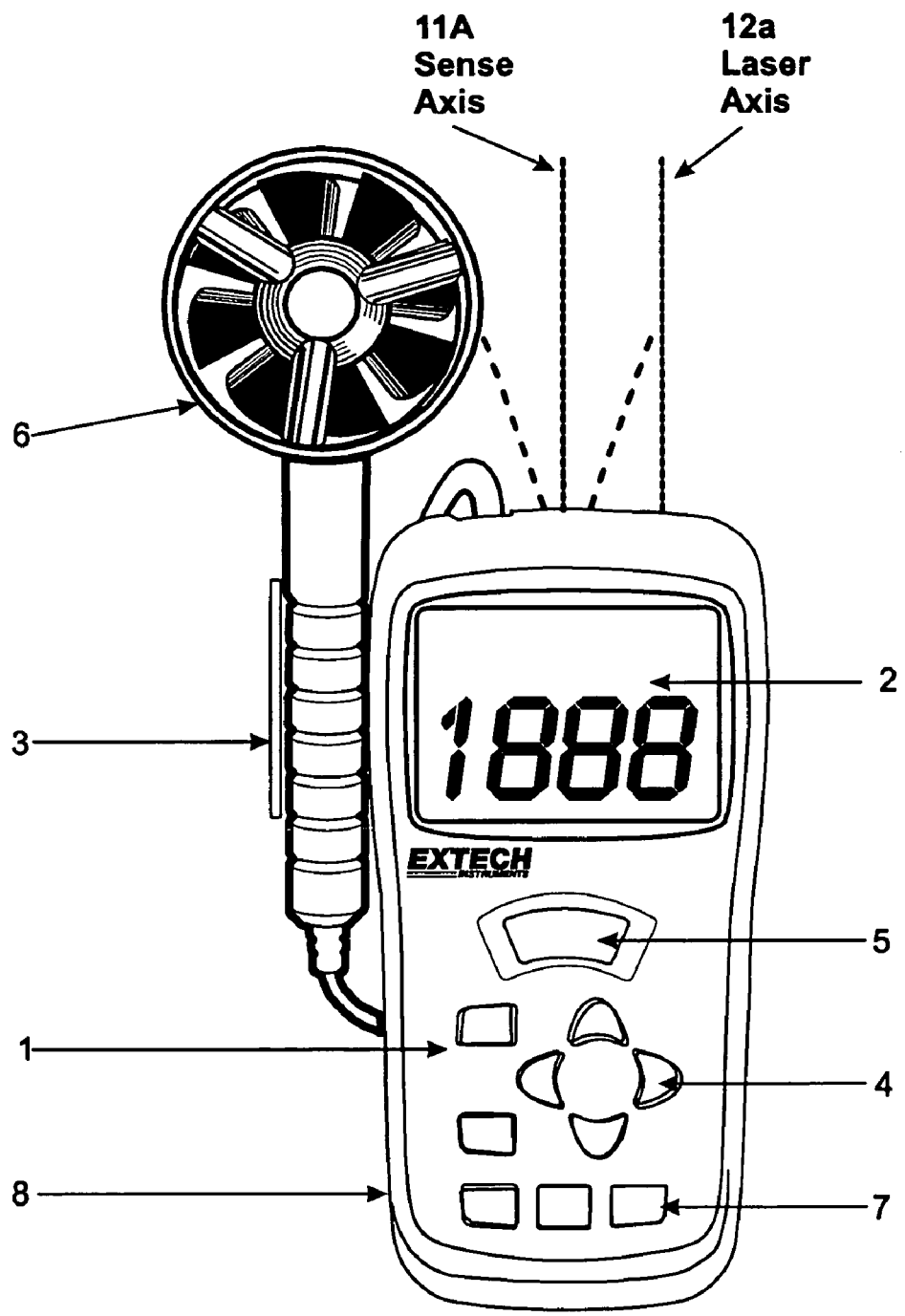
FIG. 1 is a top view of a preferred embodiment of the air velocity meter with non-contact temperature measurement according to this invention.
Figure 2:
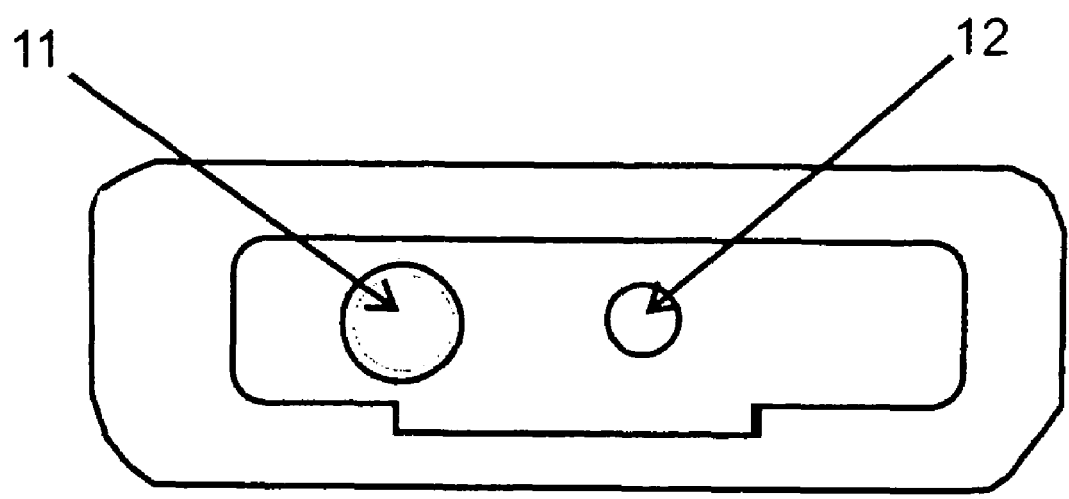
FIG. 2 is an end view of the device of FIG. 1.

A typical mechanical arrangement of the invention is shown in FIGS. 1 & 2. FIG. 1 is a top view of a typical arrangement consisting of a housing or case 1 that contains the circuitry in a convenient hand-held unit, with a digital display 2 for reading the values being measured. Pushbutton switches 4 allow the user to select one of a multiplicity of functions with a multiplicity of ranges. Pushbutton switches 7 perform further selection of parameters or functions, in combination with pushbuttons 4, related to the ambient temperature measurement. Pushbutton switch 5 can be used to turn on the laser aiming device and to accept the reading from the IR detector as opposed to the air velocity meter inputs. In other embodiments, this pushbutton may also be used to control the IR temperature readout, such as holding the temperature reading while the switch is engaged. Other types of keypads, switches and locations may be used. Since the IR temperature sensor must be pointed at the surface being measured, the display may not be easily viewable by the user while the temperature is being sensed. Thus, it may be desirable that the IR reading be taken and then held on the display for easy reading later, while the IR temperature sensor is pointed away from the surface.

Other embodiments may use these pushbuttons in combination, or alone, to achieve the same result. In addition (and not shown in the drawings) slide switches, rotary switches and/or keypads may also be used. The air velocity sensor and the ambient temperature sensor devices may be mounted in an enclosure 6 which is connected to the air velocity meter by a cable, in order that the air velocity and ambient temperature measurements may be made remotely from (but near to) the meter. A clip 3 is provided to temporarily secure the sensor enclosure to the air velocity meter for storage, or to make a local measurement. The cable may also be eliminated by use of many types of wireless communication devices. In other embodiments, the air velocity sensor and the ambient temperature sensor devices may be mounted permanently to the air velocity meter enclosure or case, without using a separate enclosure.

FIG. 2 is an end view that shows one arrangement of the infrared (IR) detector 11, used to measure the temperature of a surface or body without actual contact. It accomplishes this by detecting the IR emissions given off by the object whose surface temperature is being measured. At a specific temperature, the IR emissions from any object vary with its surface conditions, such as finish and color. This variation is a factor called "emissivity". Each type of surface has an emissivity ranging from zero to one. The emissivity of a matte black body is one. The emissivity of this embodiment of the invention is fixed, preferably at 0.95, although other emissivities could also be used. Most objects typically being measured have an emissivity reasonably close to 0.95. Other embodiments may provide means for adjusting the emissivity to improve the measurement accuracy. FIG. 2 also shows an aperture 12 through which a laser beam or another IR sensor aiming beam may be shone (typically from a laser diode) to assist in aiming the IR temperature measurement apparatus at the surface being measured.

Figure 3:
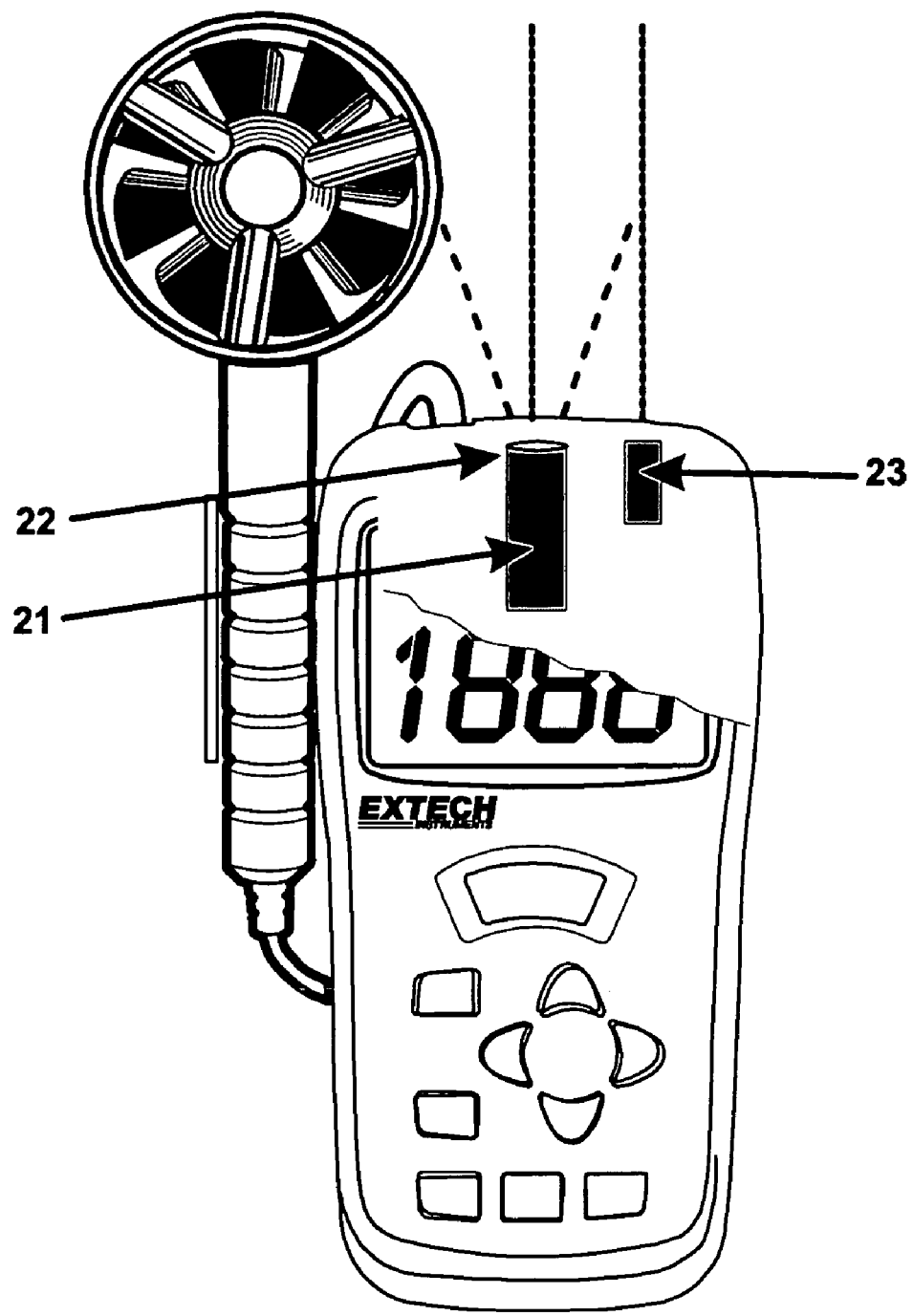
FIG. 3 is a partial cross-sectional view similar to that of FIG. 1.
Figure 5:
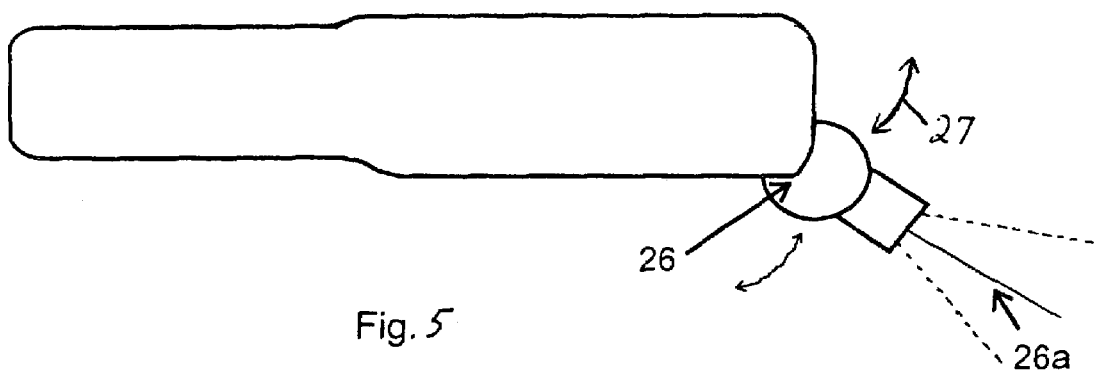
FIG. 5 is a view similar to that of FIG. 4 but for another alternative embodiment with a user-adjustable temperature sensing axis.
Figure 4:
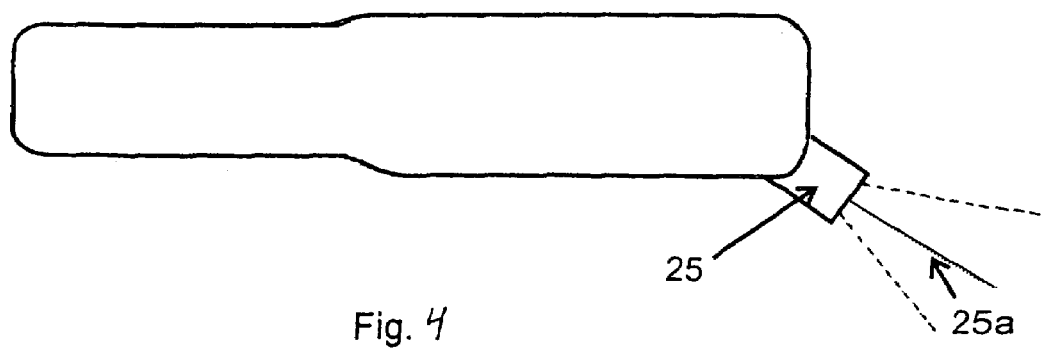
FIG. 4 is a side view of an alternative embodiment to that depicted in FIGS. 1-3, in which the temperature sensing takes place along a different axis.

IR detector 11 sense axis 11a and laser diode beam sense axis 12a, are normally fixed at a slight angle to each other to reduce parallax at the surface being measured. FIG. 3 is a partial cross-sectional view from the top of a typical arrangement of IR detector 21, and aiming laser 23. IR detector 21 may be focused, filtered and protected by lens 22. Other embodiments may have the IR detector and aiming laser mounted at a more convenient angle as shown by combination 25 having sense axis 25a in the side view of FIG. 4. These may also be mounted on a movable (for example rotatable gimbaled) mount 26 with sense axis 26a, FIG. 5. Mount 26 can move in a uniaxial or multiaxial direction as represented by arrow 27, in order to allow the user to vary the temperature measurement axis.

There may also be included with any of the above a protective covering, holster, or boot 8, FIG. 1, preferably made of a softer material to protect against mechanical damage and provide a better hand gripping surface.

Figure 6:
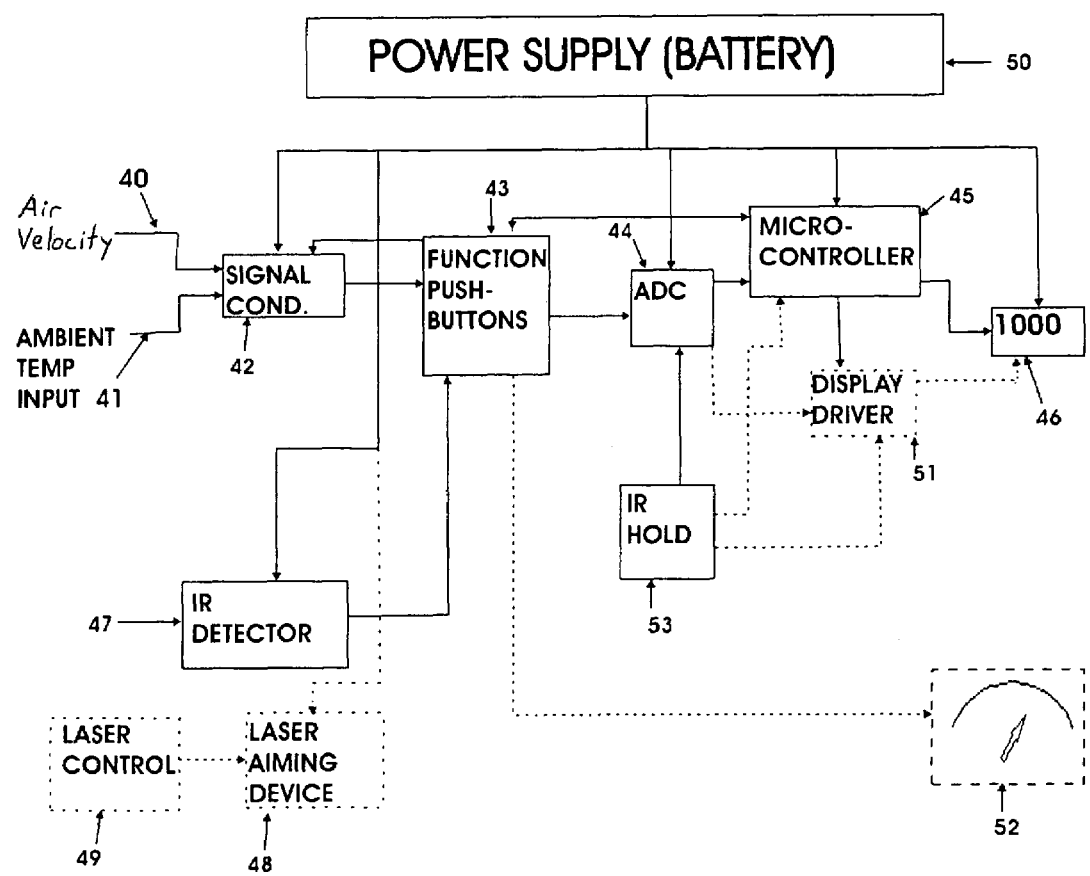
FIG. 6 is a schematic diagram of the circuit functions for the preferred embodiment of this invention.

FIG. 6 is a diagram of the circuit functions of the preferred embodiment, and shows the commonality of the devices shared by both the air velocity meter functions and the IR measuring function. Air velocity sensor input signal 40 and ambient temperature sensor device input signal 41 are processed by signal conditioning circuits 42, which are selected by pushbuttons 43, under control from micro-controller 45, for presentation to analog to digital converter (ADC) 44. Function pushbuttons 43 may also control the switching of attenuators, gain or other means to convert the measured signal to a more useful one. In alternate embodiments, the signal conditioning function may be located after the function pushbuttons, or divided in front of and between the function pushbuttons and the ADC. The output from the ADC may go directly to display drivers 51, which may also be part of ADC devices, or to microcontroller circuit 45. Microcontroller circuit 45 may also contain the ADC and/or display drivers. Digital displays 46 are driven directly from the microcontroller or the display drivers.

IR detector circuit 47 is also switched to the ADC by the function pushbuttons, similar to the anemometer input signals. Power supply 50, which usually consists of one or multiple batteries and regulating devices, provides power and reference signals as required to all of the functions described above. Other embodiments may provide a laser aiming device 48 and its control circuit 49, an IR hold circuit 53 which will hold the measured reading on the display, or may also use an analog display 52 which would not require the use of an ADC or other digital circuits.

Although specific features of the invention are shown in some drawings and not others, this is not a limitation of the invention, as the various features can be combined differently to accomplish the invention. Other embodiments will occur to those skilled in the art and are within the following claims.

What is claimed is:

1. An instrument with non-contact temperature measurement capability, comprising:

an output display contained in a housing, for displaying measurements to a user;

an anemometer having outputs relating to measured air velocity parameters, including at least air velocity and ambient temperature;

a non-contact, optically-based temperature sensing device coupled to the housing, having an output related to sensed temperature and defining a sense axis that is adjustable relative to the housing, in which the non-contact temperature sensing device is mounted in a mount that is rotatably coupled to and movable relative to the housing, to allow the user to aim the non-contact temperature sensing device; and circuitry contained in the housing for processing both the anemometer outputs and the temperature sensing device output, and transmitting the processed output to the output display.

2. The instrument with non-contact temperature measurement capability of claim 1, in which the anemometer comprises one or more air velocity or temperature sensing devices that are mounted in an enclosure that is separate from the housing and can be located some distance from the housing.

3. The instrument with non-contact temperature measurement capability of claim 1, in which the anemometer is a digital anemometer.

4. The instrument with non-contact temperature measurement capability of claim 1, further comprising a switch for switching at least some of the circuitry between the anemometer outputs and the non-contact temperature sensing device output.

5. The instrument with non-contact temperature measurement capability of claim 1, further comprising a user-operable electrical device for selectively routing the temperature sensing device output to the circuitry.

6. The instrument with non-contact temperature measurement capability of claim 1, further comprising a user-operable electrical device for selectively holding the sensed non-contact temperature 7. The instrument with non-contact temperature measurement capability of claim 1, in which the non-contact temperature sensing device comprises an infrared sensor.

8. The instrument with non-contact temperature measurement capability of claim 7, in which the non-contact temperature sensing device further comprises a lens, proximate the infrared sensor, for focusing entering radiation onto the infrared sensor.

9. An instrument with non-contact temperature measurement capability, comprising:

an output display contained in a housing, for displaying measurements to a user;

an anemometer having outputs relating to measured air velocity parameters, including at least air velocity and ambient temperature;

a non-contact, optically-based temperature sensing device coupled to the housing, having an output related to sensed temperature; circuitry contained in the housing for processing both the anemometer outputs and the temperature sensing device output, and transmitting the processed output to the output display; and an optical aiming device coupled to the housing, to assist the user in aiming the non-contact temperature sensing device at an object whose temperature is to be measured, and mounted in a mount that is rotatably coupled to and moveable relative to the housing, to allow the user to aim the optical aiming device, where the optical aiming device defines an aiming axis that is adjustable relative to the housing.

10. The instrument with non-contact temperature measurement capability of claim 9, in which the optical aiming device comprises a diode laser device.

11. A digital instrument with non-contact temperature measurement capability, comprising:

a digital output display contained in a housing, for displaying measurements to a user;

a digital anemometer having outputs relating to measured air velocity parameters including air velocity and ambient temperature;

a non-contact infrared temperature sensing device within the housing, having an output related to sensed temperature and defining a sense axis that is adjustable relative to the housing, in which the non-contact infrared temperature sensing device is mounted in a mount that is rotatably coupled to and movable relative to the housing, to allow the user to aim the non-contact infrared temperature sensing device; and circuitry contained in the housing for processing both the anemometer outputs and the non-contact infrared temperature sensing device output, and transmitting the processed output to the output display.

12. The digital instrument with non-contact temperature measurement capability of claim 11, in which the digital anemometer comprises one or more air velocity or temperature sensing devices that are mounted in an enclosure that is separate from the housing and can be located some distance from the housing.

13. The digital instrument with non-contact temperature measurement capability of claim 11, further comprising an optical aiming device coupled to the housing, to assist the user in aiming the non-contact temperature sensing device at an object whose temperature is to be measured.

14. The digital instrument with non-contact temperature measurement capability of claim 13, in which the optical aiming device is mounted in a mount that is coupled to and movable relative to the housing, to allow the user to aim the optical aiming device.

15. A digital instrument with non-contact temperature measurement capability, comprising:

a digital output display contained in a housing, for displaying measurements to a user;

a digital anemometer comprising air velocity or temperature sensing devices that are mounted in an enclosure that is separate from the housing and can be located some distance from the anemometer housing and having outputs relating to the measured air velocity and ambient temperature;

a non-contact infrared temperature sensing device within the housing, having an output related to sensed temperature;

an optical aiming device coupled to the housing, to assist the user in aiming the non-contact temperature sensing device at an object whose temperature is to be measured; and circuitry contained in the housing for processing both the anemometer outputs and the non-contact temperature sensing device output, and transmitting the processed output to the output display.

* * * * *